(12) United States Patent
Kadiri et al.

(10) Patent No.: US 11,394,276 B2
(45) Date of Patent: Jul. 19, 2022

(54) ROTATING ELECTRICAL MACHINE PROVIDED WITH A CURRENT SENSOR AND A DIAGNOSTIC MODULE

(71) Applicant: Valeo Equipements Electriques Moteur, Creteil (FR)

(72) Inventors: Mostafa Kadiri, Etaples-sur-Mer (FR); Pierre Faverolle, Creteil (FR); Matthieu Mallevaey, Etaples-sur-Mer (FR); Ludovic Doffe, Etaples-sur-Mer (FR); Gauthier Ryckeboer, Etaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 17/255,179

(22) PCT Filed: Jun. 26, 2019

(86) PCT No.: PCT/FR2019/051582
§ 371 (c)(1),
(2) Date: Dec. 22, 2020

(87) PCT Pub. No.: WO2020/002839
PCT Pub. Date: Jan. 2, 2020

(65) Prior Publication Data
US 2021/0273526 A1 Sep. 2, 2021

(30) Foreign Application Priority Data

Jun. 27, 2018 (FR) ..................................... 1855817

(51) Int. Cl.
*H02K 11/049* (2016.01)
*H02K 11/25* (2016.01)
(Continued)

(52) U.S. Cl.
CPC ......... *H02K 11/049* (2016.01); *H02H 7/0844* (2013.01); *H02K 11/25* (2016.01); *H02K 11/27* (2016.01)

(58) Field of Classification Search
CPC .... H02P 29/0241; H02P 29/48; H02P 29/006; H02P 29/10; H02P 29/105; H02P 29/032;
(Continued)

(56) References Cited

U.S. PATENT DOCUMENTS 5,841,643 A * 11/1998 Schenkel .......... H02M 3/33507
363/21.13
7,508,172 B1 * 3/2009 Nishimura .......... H02P 29/0241
290/40 A (Continued)

FOREIGN PATENT DOCUMENTS

DE 10112217 A1 10/2002
EP 0803962 A1 10/1997
(Continued)

OTHER PUBLICATIONS

International Search Report with Written Opinion in corresponding International Application No. PCT/FR2019/051582, dated Oct. 7, 2019 (14 pages).

*Primary Examiner* — Bryan R Perez
(74) *Attorney, Agent, or Firm* — Osha Bergman Watanabe & Burton LLP

(57) ABSTRACT

The invention mainly relates to a rotating electrical machine (10) comprising: a rotor (12) provided with a rotor winding (13); a stator (11) provided with a winding (14) having a plurality of phases; a converter (16) comprising rectifying components (17) to which the phases of the stator (11) are connected; a voltage regulator (24) for adapting an excitation current (Iexc) applied to the rotor winding (13) according to a difference between an output voltage (Liait) and a reference voltage; at least one current sensor (27) arranged
(Continued)

at the output of the rotating electrical machine (10) or on at least one phase of the rotating electrical machine (10); and a diagnostic module (30) that can detect a malfunction of the rotating electrical machine (10) on the basis of a current measurement provided by the current sensor (27).

9 Claims, 5 Drawing Sheets

(51) Int. Cl.
*H02K 11/27* (2016.01)
*H02H 7/08* (2006.01)

(58) Field of Classification Search
CPC .......... H02P 2101/45; H02P 6/14; H02P 9/30; H02J 7/1461; H02J 7/14; H02J 7/00308; H02J 7/1492; H02J 7/24
See application file for complete search history.

(56) References Cited

U.S. PATENT DOCUMENTS

| | | | |
|---|---|---|---|
| 8,159,180 B2* | 4/2012 | Suzuki | H02J 7/1492 320/104 |
| 2006/0192533 A1 | 8/2006 | Kimura et al. | |
| 2007/0200534 A1 | 8/2007 | Kizawa et al. | |
| 2009/0237037 A1 | 9/2009 | Martin | |
| 2010/0066097 A1 | 3/2010 | Verdejo et al. | |
| 2016/0241176 A1* | 8/2016 | Verma | H02P 9/48 |

FOREIGN PATENT DOCUMENTS

| | | |
|---|---|---|
| EP | 0831580 A2 | 3/1998 |
| FR | 3005900 A1 | 11/2014 |
| WO | 0169762 A1 | 9/2001 |
| WO | 02093717 A1 | 11/2002 |
| WO | 2004040738 A1 | 5/2004 |
| WO | 2006129030 A1 | 12/2006 |
| WO | 2007051936 A1 | 5/2007 |
| WO | 2009081066 A2 | 7/2009 |

* cited by examiner

ROTATING ELECTRICAL MACHINE PROVIDED WITH A CURRENT SENSOR AND A DIAGNOSTIC MODULE

The present invention relates to a rotary electrical machine provided with a current sensor and a diagnostic module. The invention has a particularly advantageous application with alternators and alternator-starters which equip motor vehicles.

In a known manner, rotary electrical machines comprise two coaxial parts, i.e. a rotor and a stator surrounding the body of the rotor. The rotor can be integral with a driving and/or a driven shaft, and can belong to a rotary electrical machine in the form of an alternator, as described for example in documents EP0803962 and WO02/093717, or of an electric motor as described for example in document EP0831580. The rotary electrical machine can be reversible, as described for example in documents WO01/69762, WO2004/040738, WO2006/129030, and FR3005900. A synchronous reversible rotary electrical machine of this type is known as an alternator-starter.

In alternator mode, the electrical machine transforms mechanical energy into electrical energy, in order in particular to supply power to the consumers and/or recharge a battery.

In order to reduce substantially the emissions of pollutant particles in homologation cycles or out of cycles, i.e. during the real travel life of the motor vehicle, the electrical machine operates in alternator mode, in particular during recuperative braking phases, which are very frequent. The electrical machine and its sub-components are thus taxed to their operating limit.

The need therefore exists to implement protection in order to maximise the performance levels of the electrical machine, whilst maintaining a high level of reliability.

The objective of the invention is to fulfil this need by proposing a rotary electrical machine comprising:
  a rotor provided with a rotor winding;
  a stator provided with a winding comprising a plurality of phases;
  a convertor comprising rectification components to which the phases of the stator are connected;
  a voltage regulator which can adapt an excitation current applied to the rotor winding according to a difference between an output voltage of the rotary electrical machine and a reference voltage,
characterised in that the said rotary electrical machine additionally comprises:
  at least one current sensor placed at the output of the rotary electrical machine or on at least one phase of the rotary electrical machine; and
  a diagnostic module which can detect malfunctioning of the rotary electrical machine on the basis of a current measurement obtained from the current sensor.

Thus, thanks to the use of the current sensor and the diagnostic module, the invention makes it possible to detect and inform the engine control of any failure and/or drift in the performance levels of the rotary electrical machine.

According to one embodiment, the diagnostic module is incorporated in the regulator.

According to one embodiment, the diagnostic module is a module which is external relative to the regulator.

According to one embodiment, by means of a law of variation of a voltage drop at the terminals of a rectification component, the diagnostic module can estimate a junction temperature of this rectification component.

According to one embodiment, the diagnostic module can limit this junction temperature in order to protect this rectification component.

According to one embodiment, the diagnostic module can detect a failure on a phase of the rotary electrical machine on the basis of the current measurement obtained from the current sensor.

According to one embodiment, the diagnostic module can determine a theoretical output of the rotary electrical machine, and compare it with a reference output, in order to deduce from this any drift representative of deterioration of performance levels of the rotary electrical machine.

According to one embodiment, the diagnostic module can measure a ripple of an output current of the rotary electrical machine, and detect a failure of the rotary electrical machine in the case when a variation of current over a period of the output current exceeds a reference value.

According to one embodiment, the diagnostic module can establish an operating diagnostic of the rotary electrical machine on the basis of output current measurements of the rotary electrical machine and measurements of the excitation current.

According to one embodiment, the diagnostic module can detect a drift of performance levels of a rectification component on the basis of a measurement of a voltage drop at a given current of the said rectification component.

The invention will be better understood by reading the following description and examining the figures which accompany it. These figures are provided purely by way of illustration, and in no way limit the invention.

Elements which are identical, similar or analogous retain the same reference from one figure to another.

Figure 1A:
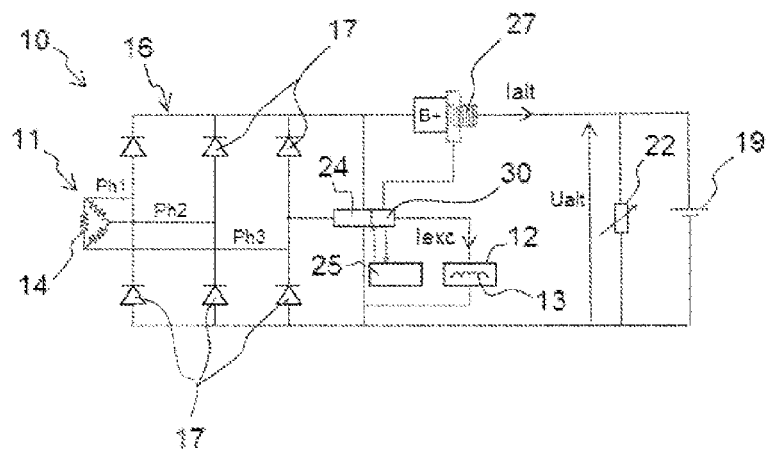
FIG. 1a is a schematic representation of a first embodiment of the invention having an output current sensor for the alternator and a diagnostic module incorporated in the regulator.
Figure 1B:
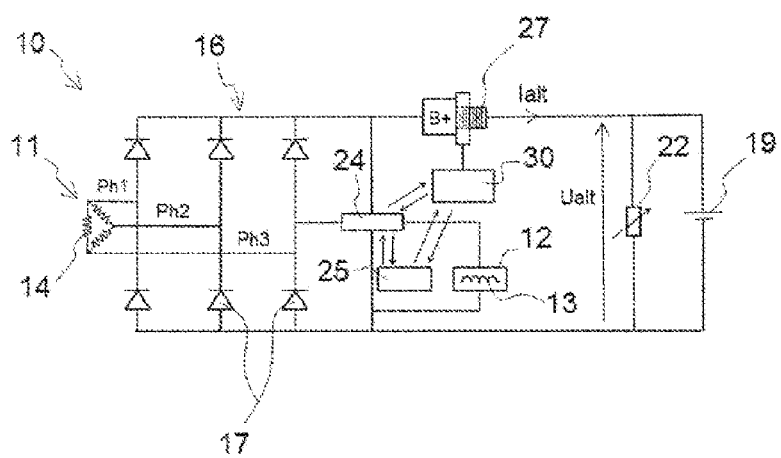
FIG. 1b is a schematic representation of a variant embodiment with an external diagnostic module.

FIGS. 1 and 1b represent schematically a rotary electrical machine 10 in the form of an alternator, comprising a stator 11 and a rotor 12 provided with a winding 13. The rotor 12 can generate a magnetic flux interacting with the stator 11.

The stator 11 comprises a winding 14 with a plurality of phases Ph1-PhN connected to an AC/DC converter 16. In the figures, in a non-limiting manner, a stator 11 with three phases Ph1-Ph3 is represented by way of example. In fact, it is clear that the stator 11 can comprise more generally N phases, N being a whole number. N can for example be equal to 3 for a three-phase stator, 5 for a pentaphase stator, 6 for a hexaphase stator, 7 for a heptaphase stator, etc., or it can be any whole number.

The AC/DC converter 16 is typically formed by rectification components 17, which in this case are represented by diodes, but can also be in the form of transistors of the MOSFET type. In this case, the AC/DC converter 16 is reversible, in order to transform the direct voltage of the battery 19 into an alternating voltage supplying the phases of the winding Ph1-PhN with power in order to make the machine operate in motor mode.

During operation of the alternator 10, the output voltage Ualt measured between the terminal B+ and the ground can be supplied to the battery 19 by the stator 11 by means of the converter 16. More specifically, electromotive forces are present in each of the phases Ph1-PhN of the winding of the stator 11, and are processed by the converter 16 in order to generate the output voltage Ualt.

Similarly, an output current Ialt can be supplied to the battery 19 and to the electrical charges 22 by the stator 11 after processing by the converter 16. In this case, the electrical charges 22 are connected in parallel with the battery 19.

The alternator 10 also comprises a regulator 24, making it possible to subject the output voltage Ualt to a reference voltage which is generally supplied by an engine computer 25 of the vehicle. For this purpose, the regulator 24 adapts an excitation current Iexc, which is applied by means of pulse width modulation to the stator winding 13, according to a difference between the output voltage Ualt of the alternator 10 and the reference voltage.

In addition, a current sensor 27 can be placed at the output of the alternator 10 at the terminal B+, as shown in FIGS. 1a and 1b. As a variant, a current sensor 27 is placed on at least phase Ph1-PhN of the alternator 10. In the example represented, one sensor 27 per phase is used, but, as a variant, it is possible to use a sensor 27 on a single phase, and deduce the signals of the other phases on the basis of the measurements of this sensor. A sensor 27 can be in the form of a Hall-effect sensor or a resistance sensor of the type known as a shunt.

A diagnostic module 30 can detect malfunctioning of the alternator 10 on the basis of the current measurement obtained from at least one current sensor 27.

Figure 2A:
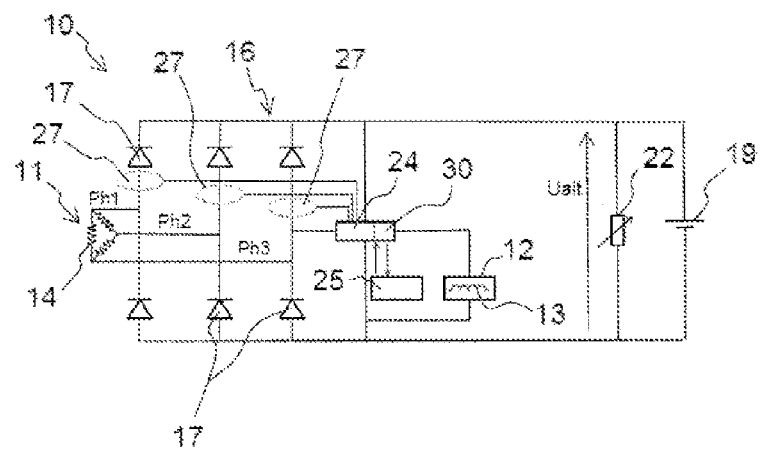
FIG. 2a is a schematic representation of a second embodiment of the invention having a current sensor for phases of the alternator and a diagnostic module incorporated in the regulator.

The diagnostic module 30 can be incorporated in the regulator 24, as represented in FIGS. 1a and 2a. In this case, the regulator 24 communicates the information relating to the operation of the alternator 10 to the engine computer 25 via a communication bus of the LIN or CAN type for example.

Figure 2B:
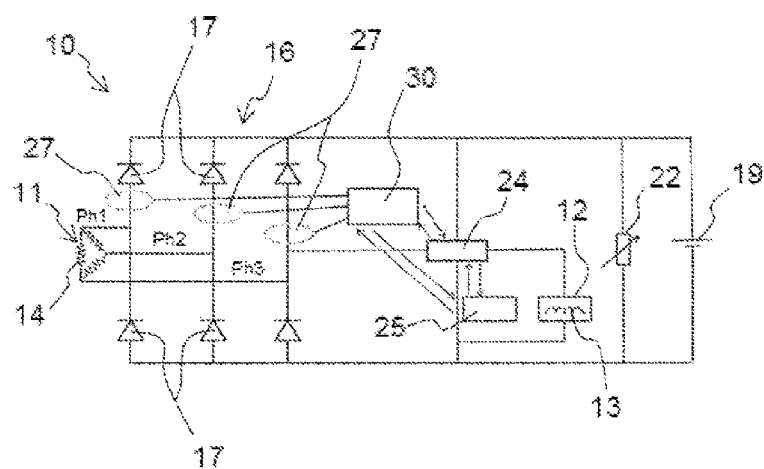
FIG. 2b is a schematic representation of a variant embodiment with an external diagnostic module.

Alternatively, the diagnostic module 30 is an external module, as shown in FIGS. 1b and 2b. This makes it possible to facilitate the creation of the regulator 24, which then has fewer integrated functionalities. In this case, communication is provided between the regulator 24 and the diagnostic module 30, between the regulator 24 and the engine computer 25, and communication is provided between the diagnostic module 30 and the engine computer 25. These communications can also be established via a communication bus of the LIN or CAN type.

The diagnostic module 30 can determine a theoretical output n of the alternator 10 on the basis of the following formula:

$$n = Pelec/Pmeca = (Ualt \times Ialt)/(C \times \Omega);$$

Figure 3:
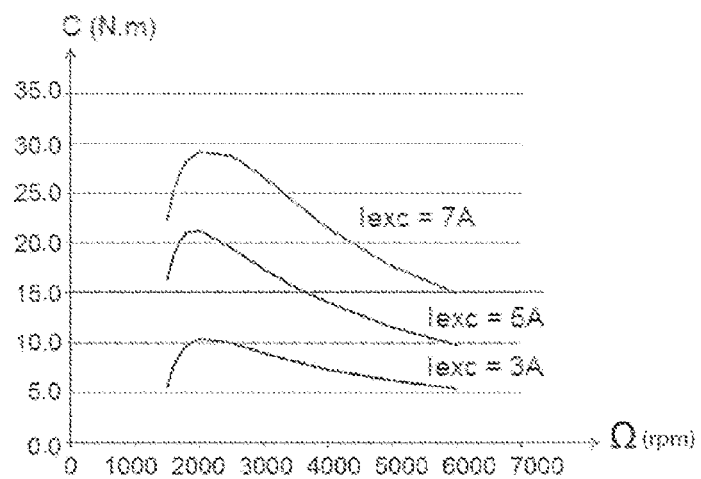
FIG. 3 is a graphic representation of a cartography making it possible to determine a torque on the basis of a speed of rotation of the machine for a given excitation current.

Pelec being the electrical power of the alternator and Pmeca being the mechanical power of the alternator;

Ualt being the output voltage of the alternator 10 measured by the regulator 24;

Ialt being the output current of the alternator 10 measured by the current sensor 27;

$\Omega$ being the speed of rotation determined by means of the frequency of a phase applied at the input of the regulator 24;

C being the torque of the alternator 10 derived from a measurement cartography carried out previously in the laboratory and incorporated in the diagnostic module 30 or the regulator 24. This cartography, a graphic representation of which is given in FIG. 3, makes it possible to supply the torque data C for calculation of output n on the basis of the speed of rotation $\Omega$ of the alternator 10, and of an excitation current Iexc applied to the rotor 12.

The theoretical output n is then compared with a reference output, in order to deduce from this any drift which is representative of deterioration of performance of the alternator 10.

Figure 4:
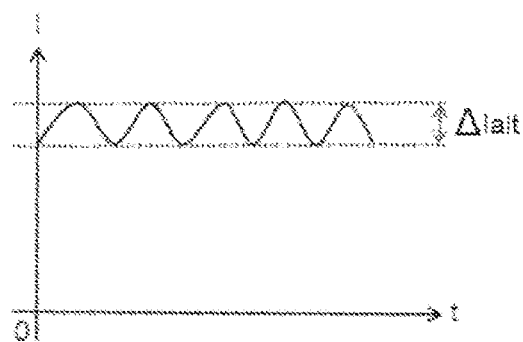
FIG. 4 is a graphic representation of a variation of the output current, the measurement of which by means of the current sensor according to the invention makes it possible to detect malfunctioning of the electrical machine.

As can be seen in FIG. 4, the diagnostic module 30 can measure a ripple of an output current $\Delta$Ialt of the alternator 10, and detect a failure in the case when a variation of current $\Delta$Ialt during a period of the output current exceeds a reference value. In particular, if, during a period corresponding to the switching of each rectification component 17, the current ripple $\Delta$Ialt becomes greater than a reference value, the diagnostic module 30 emits an alert signal to the engine computer 25.

Figure 5:
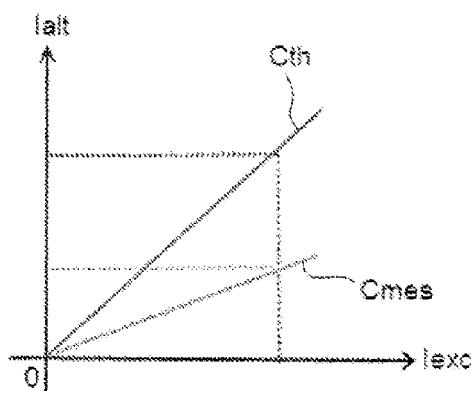
FIG. 5 is a graphic representation of the curves measured and expected obtained on the alternator current/excitation current plane, making it possible to detect malfunctioning of the electrical machine.

As can be seen in FIG. 5, the diagnostic module 30 can also establish an operating diagnostic of the alternator 10, on the basis of output current measurements Ialt of the alternator 10, and measurements of the excitation current Iexc. For this purpose, the difference is compared between the measured curve Cmes obtained on the basis of a plurality of measurements of the currents Ialt and Iexc, and the expected curve Cth stored in the memory of the diagnostic module 30 or the engine computer 25. In the case of an excessive difference, the module 30 emits an alert signal to the engine computer 25.

In addition, it is possible to estimate the junction temperature of the component, by correlating the current measurement Id_mes and the voltage measurement Vd_mes carried out on the rectification component 17, taking the form of a diode or a transistor of the MOSFET type.

Figure 6:
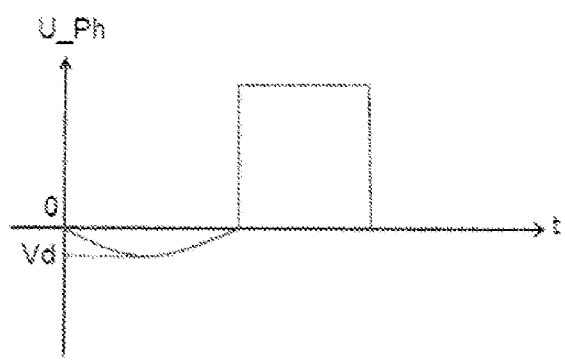
FIG. 6 is a schematic representation of a phase voltage making it possible to determine the voltage drop of a rectification component in the on state.

In fact, it is possible to determine the voltage Vd of the rectification component 17 in the on state during negative alternation of the phase voltage U_Ph (cf. FIG. 6), as well as the corresponding current Id.

Figure 7:
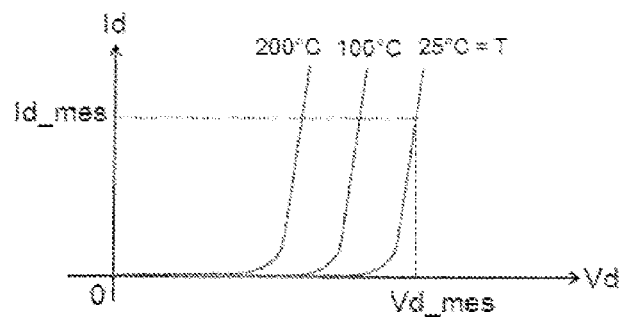
FIG. 7 is a variation law stored in the regulator or the external diagnostic module, making it possible to determine the temperature of a rectification component in the form of a diode.
Figure 8:
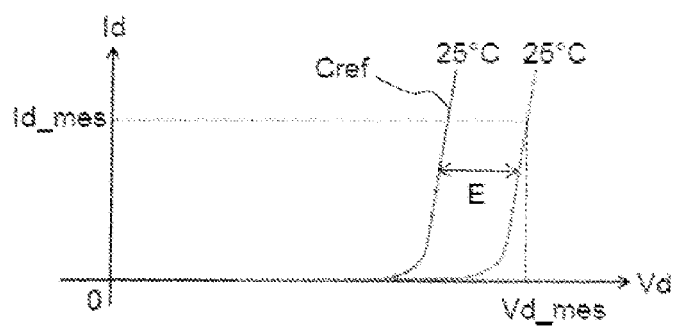
FIG. 8 is a graphic representation illustrating the detection by the diagnostic module of a drift of performance level which can be detected by measurement of a voltage and a current of a rectification component.

On the basis of these two values, a law of variation of a voltage drop at the terminals of a rectification component 17 in the form of a diode, according to the temperature represented in FIG. 7, makes it possible to estimate a junction temperature T of the component. This law of variation can be stored in the diagnostic module 30 or the regulator 24.

The diagnostic module 30 can then limit this junction temperature T in order to protect the component 17, in particular by limiting an output current Ialt of the alternator 10, in order to supply a maximum power available to the vehicle, whilst maintaining a maximum permissible temperature at the junctions of the components 17.

The diagnostic module 30 can also detect a drift of performance levels of a rectification component 17 on the basis of a measurement of a voltage drop Vd_mes at a given current Id_mes.

For example, if the current Id_mes/voltage Vd_mes pair has an excessive difference E from the expected value of the curve Cref for a given temperature, the diagnostic module 30 deduces from this that the performance levels of the component 17 have deteriorated.

The diagnostic module 30 then alerts the engine computer 25 of a change of state of one or a plurality of components 17, by sending a corresponding alert message to the communication bus of the vehicle.

The measurements used by the diagnostic module 30 can be carried out if the thermal engine and its components have a thermal equilibrium at ambient temperature. For example, a measurement command can be sent by the engine computer 25, when the ambient temperature and the temperature of the engine are very close, with a difference for example of approximately plus or minus 5° C. In addition, communication of this temperature could be envisaged to the regulator 24 or to the diagnostic module 30, in order to compare the temperature of the chip of the regulator 24, and to ensure that there is a stabilised and cooled thermal state.

Thus, when the thermal engine is switched on and the alternator 10 current is generated, the diagnostic module 30 could launch a diagnostic of the state of the rectification components 17.

The invention can also be implemented with an alternator-starter or an electrical machine operating only in motor mode.

It will be appreciated that the foregoing description has been provided purely by way of example, and does not limit the field of the invention, a departure from which would not be constituted by replacing the different elements by any other equivalents.

In addition, the different characteristics, variants, and/or embodiments of the present invention can be associated with one another according to various combinations, provided that they are not incompatible or mutually exclusive.

The invention claimed is:

1. A rotary electrical machine comprising:
   a rotor provided with a rotor winding;
   a stator provided with a winding comprising a plurality of phases;
   a convertor comprising rectification components to which the phases of the stator are connected;
   a voltage regulator which can adapt an excitation current applied to the rotor winding according to a difference between an output voltage of the rotary electrical machine and a reference voltage;
   at least one current sensor placed at the output of the rotary electrical machine or on at least one phase of the rotary electrical machine; and
   a diagnostic module configured to detect malfunctioning of the rotary electrical machine on a basis of a current measurement obtained from the current sensor,
   wherein the diagnostic module is configured to estimate a junction temperature of one of the rectification components on a basis of a law of variation of a voltage drop across terminals of the rectification component.

2. The rotary electrical machine according to claim 1, wherein the diagnostic module is integrated in the voltage regulator.

3. The rotary electrical machine according to claim 1, wherein the diagnostic module is an external module relative to the voltage regulator.

4. The rotary electrical machine according to claim 1, wherein the diagnostic module limits this junction temperature in order to protect the corresponding rectification component.

5. The rotary electrical machine according to claim 1, wherein the diagnostic module can detect a failure on a phase of the rotary electrical machine on the basis of the current measurement obtained from the current sensor.

6. The rotary electrical machine according to claim 1, wherein the diagnostic module determines a theoretical output of the rotary electrical machine, and compare with a reference output, to deduce from this any drift representative of deterioration of performance levels of the rotary electrical machine.

7. The rotary electrical machine according to claim 1, wherein the diagnostic module measures a ripple of an output current of the rotary electrical machine, and detects a failure of the rotary electrical machine in a case when a variation of current over a period of the output current exceeds a reference value.

8. The rotary electrical machine according to claim 1, wherein the diagnostic module can establish an operating diagnostic of the rotary electrical machine on the basis of output current measurements of the rotary electrical machine and measurements of the excitation current.

9. The rotary electrical machine according to claim 1, wherein the diagnostic module can detect a drift in performance levels of a rectification component on the basis of a measurement of a voltage drop at a given current of the rectification component.

* * * * *